United States Patent
Prendergast et al.

(10) Patent No.: US 6,651,884 B2
(45) Date of Patent: Nov. 25, 2003

(54) SYSTEM FOR RANKING CARD REISSUE TRANSACTIONS

(75) Inventors: Jim K. Prendergast, Omaha, NE (US); Michelle Buggs, Omaha, NE (US); John Coleman, Omaha, NE (US); Rebecca Goodman, Omaha, NE (US); Sharon Hogan, Omaha, NE (US)

(73) Assignee: First Data Corporation, Englewood, CO (US)

( * ) Notice: Subject to any disclaimer, the term of this patent is extended or adjusted under 35 U.S.C. 154(b) by 0 days.

(21) Appl. No.: 10/108,217

(22) Filed: Mar. 26, 2002

(65) Prior Publication Data

US 2003/0183686 A1 Oct. 2, 2003

(51) Int. Cl.$^7$ ................................. G06K 5/00
(52) U.S. Cl. .................. 235/380; 235/379; 235/487; 705/38; 705/35
(58) Field of Search ............... 235/379, 380, 235/487; 705/38, 35, 39, 41, 42

(56) References Cited

U.S. PATENT DOCUMENTS

| | | | | |
|---|---|---|---|---|
| 5,774,882 A | * | 6/1998 | Keen et al. | 705/38 |
| 6,014,645 A | * | 1/2000 | Cunningham | 705/38 |
| 6,105,007 A | * | 8/2000 | Norris | 705/38 |
| 6,119,103 A | * | 9/2000 | Basch et al. | 705/35 |
| 6,158,657 A | * | 12/2000 | Hall et al. | 235/380 |
| 6,315,193 B1 | * | 11/2001 | Hogan | 235/379 |
| 6,405,181 B2 | * | 6/2002 | Lent et al. | 705/38 |

* cited by examiner

*Primary Examiner*—Michael G. Lee
*Assistant Examiner*—Steven S. Paik
(74) *Attorney, Agent, or Firm*—Townsend and Townsend and Crew LLP

(57) ABSTRACT

A system and method for selectively processing information to reissue cards to cardholders. The method includes assigning scores to cardholder accounts. Thereafter, the cardholder accounts are evaluated to determine eligibility for reissue. The method further includes the step of classifying into one or more groups, those cardholder accounts found eligible for reissue, wherein a first one of the groups contain cardholder accounts with a first set of scores, and a second one of the groups contain cardholder accounts with a second set of scores. Thereafter, the first group with the first set of scores is processed before the second group with the second set of scores.

15 Claims, 2 Drawing Sheets

SYSTEM FOR RANKING CARD REISSUE TRANSACTIONS

CROSS-REFERENCES TO RELATED APPLICATIONS

This application is related to U.S. application Ser. No. 10/109,459, entitled "System for Card Processing, Embossing and Fulfillment", filed Mar. 26, 2002, the complete disclosure of which is herein incorporated by reference.

BACKGROUND OF THE INVENTION

This invention relates generally to the field of card issuance units. More specifically, the invention relates to reissue processing and ranking reissue records for fulfilling card issuance units (e.g., credit cards, smart cards, phone cards and the like).

Reissue processing refers to renewal of card issuance units (CIUs) prior to expiration. CIUs are credit cards, smart cards or the like, alone, or in combination with card carriers, personal information number mailers, etc. CIUs are often provided by various institutions to their customers. For example, a bank may issue a credit card for use by its customer upon credit approval. These credit cards may be produced by third parties often unrelated to the institution. When a credit card is desired, the institution forwards the cardholder's information to a third party for embossing. The third party then embosses the cardholder information on the credit card, all on behalf of the institution. Embossing refers to imprinting the cardholder's name and account number, etc., on the credit card. After the credit card is embossed, it is forwarded to the cardholder for use.

As generally known, credit cards often expire after a certain duration. Prior to expiration, the cardholder's record is generated by the third party. If the cardholder's account is eligible, a new credit card is embossed and issued to replace the old one. The process is accomplished by randomly processing reissue records for all eligible cardholders. It is therefore advantageous, to rank reissue records such that preferred records are processed first before the less preferred records.

BRIEF SUMMARY OF THE INVENTION

The invention provides systems and methods for ranking reissue records. These records contain cardholder account information which is evaluated when credit cards are renewed. By using ranking, records for preferred customers are fulfilled before other customer records are processed. Various embodiments of the invention are disclosed.

In one embodiment, such a method selectively processes cardholder records according to a hierarchy in order to reissue credit cards. The method may be implemented during month-end processing, usually, two months prior to expiration of the credit card. Among other steps, the method includes assigning scores to cardholder accounts that are scheduled for reissue; and thereafter, evaluating the cardholder accounts to determine eligibility for reissue. Conveniently, such scores may be assigned by a client based on discretionary criteria.

After the scores are assigned, cardholder accounts are classified into two or more groups. Group one contains cardholders with a first set of scores while group two contains cardholders with a second set of scores. Conveniently, the first set scores may be higher scores while the second set of scores may be lower scores, for example. Contrawise, the first set of scores may be lower scores while the second set of scores may be higher scores. In this manner, preferred cardholders with lower credit risks are assigned to groups to be processed first, while higher credit risk cardholders are assigned to groups that are later processed. When sufficient resources are available, the credit cards are fulfilled. Group one records are processed first, followed by group two records. By processing records according to their groups, credit cards for preferred cardholder accounts are generated before high risk accounts are generated. In this manner, financial institutions can reduce their risk because the high risk accounts are processed last.

In an alternate embodiment, a method for ranking records in order to issue cards is disclosed. This method is generally applicable to CIUs. The method includes providing a first record for issuing a first card to a cardholder, and a second record for issuing a second card to another cardholder. In one embodiment the records contain account information for a prospective cardholder. In a further embodiment, the records contain reissue account information for a current cardholder. Thereafter, in either embodiment, a first value is assigned to the first record. The first value may be a discretionary value from the client, or an eligibility process score. Similarly, a second value different from the first is assigned to the second record. After the values are assigned, the first value is used to classify the first record into a first group while the second value is used to classify the second record into a second group. In this manner, the records in the first group are processed prior to those records in the second group.

A further embodiment of this invention may be found in a system for ranking records to reissue cards to cardholders. Among other components, the system includes programming code for assigning scores to cardholder accounts that are scheduled for reissue. Also, the system includes programming code for evaluating cardholder accounts to determine eligibility for reissue, and for assigning scores to eligible cardholder accounts. Further, the system includes programming code for classifying the cardholder into groups. It should be noted that a first group contains cardholder with a first set of scores, and a second group contains cardholder with a second set of scores. The second set of scores are different from the first set of scores. The system further includes programming code for processing the records for the first group before processing the records for the second group.

A further understanding of the nature and advantages of the present invention herein may be realized by reference to the remaining portions of the specification and the attached drawings. Further features and advantages of the present invention, as well as the structure and operation of various embodiments of the present invention, are described in detail below with respect to the accompanying drawings. In the drawings, the same reference numbers indicate identical or functionally similar elements.

DETAILED DESCRIPTION OF THE INVENTION

Figure 1:
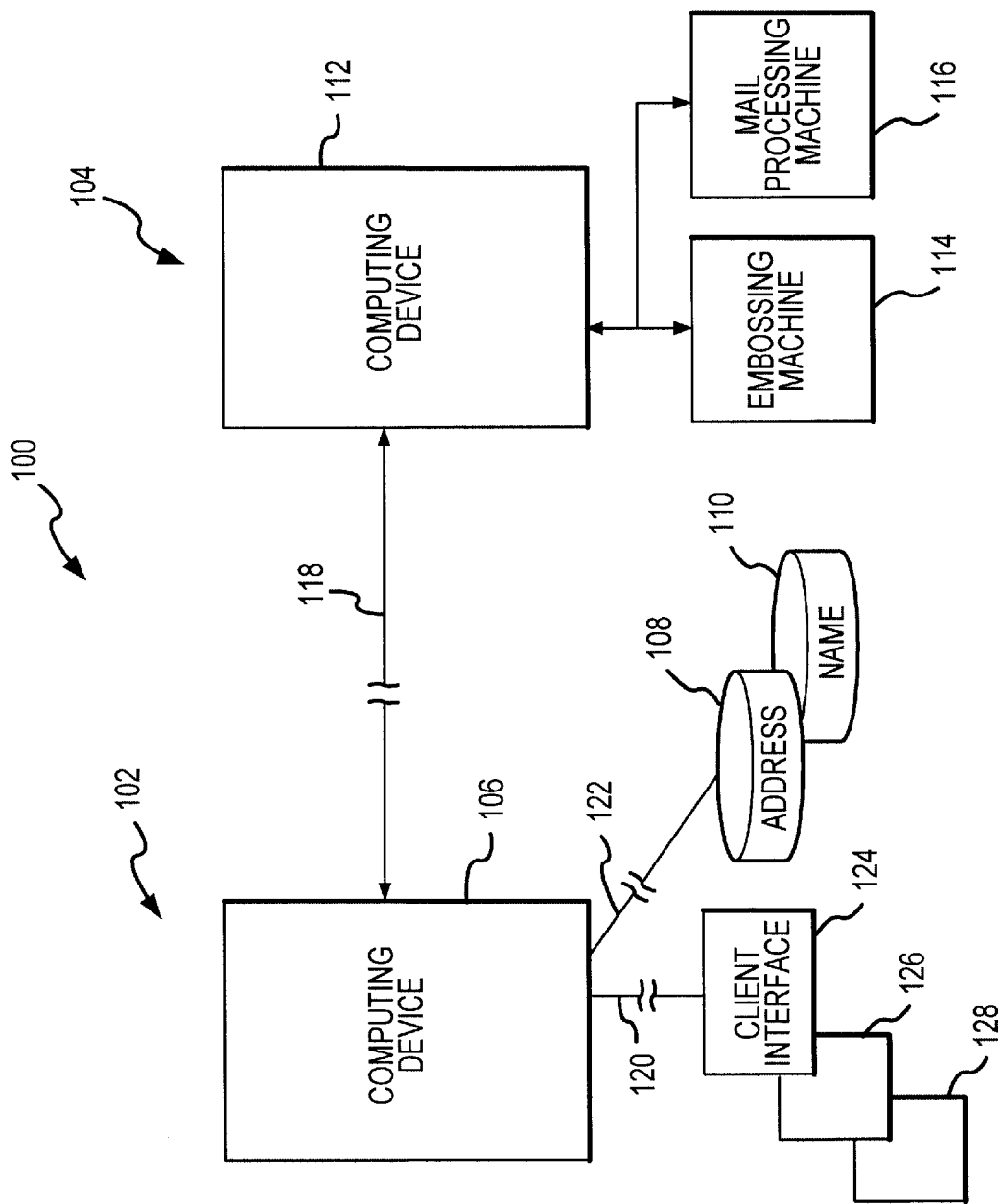
FIG. 1 illustrates a CIU system for processing reissue requests, and for ranking reissue records according to a first embodiment of the present invention.

The invention provides systems and methods for ranking reissue records to reissue cards to cardholders. Thus the invention is used with reissue processing for renewing cards, e.g., credit cards to current cardholders. One example of reissue processing that may be with ranking is described in co-pending U.S. patent application Ser. No. 10/108,806, entitled "Method and System For Processing Card Reissue Transactions" filed Mar. 26, 2002, the disclosure of which is hereby incorporated by reference as if fully set forth in this specification. The invention may also be used for ranking records other than reissue records. New records may be ranked to facilitate embossing cards for preferred new cards holders, for example. An example of processing new records is disclosed in the parent application of this invention.

Cards that may be embossed include credit cards, smart cards and other types of card issuance units (CIUs). Although described with reference to credit cards, one of ordinary skill in the art will realize that the present invention is applicable to CIUs and other polymer type cards. The invention is operable using one or more suitably programmed computing systems. The computing system may include mainframe systems, mid-range computing devices and other type computing devices. Further, these devices may be stand-alone or networked. These records contain cardholder account information which is evaluated when a CIU for the cardholder is renewed. By employing ranking, records for preferred cardholder accounts are fulfilled before other cardholder accounts are processed. In this manner, credit cards for preferred cardholders are generated before cards for high risk cardholders. In this manner, many financial institutions reduce risk since lower scoring accounts are processed last.

As noted, the method of the present invention may be used with reissue processing. This process occurs during month-end processing, usually, two months prior to expiration of the credit card. However, it can be implemented at any designated time. Initially, scores are assigned to cardholder accounts by the client. Alternatively, the scores may be assigned using an account behavior score. The account behavior score is based on customer behavior including spending patterns, credit limit, number of times this limit was exceeded, etc.

After the scores are assigned, the cardholder accounts are evaluated to determine eligibility for reissue. Thereafter, cardholder accounts are classified into one or more groups. Each group contains no more than 25% of a client's embossing records. In one aspect, the records are specifically classified into four groups. Group one contains records for accounts with the highest scores, group two contains records for the next highest scores, group three contains records with scores lower than group two scores, and group four contains the lowest scores. Once the production facility has sufficient capacity to emboss the credit cards, it processes group one records with higher scores first before processing group two records with lower scores.

One advantage of this invention is that credit cards for preferred cardholders are generated first before cards for lower-scoring customers. Furthermore, records are generated to produce the credit cards when there are sufficient resources to produce the credit cards. In this manner, the most current information available is used for fulfilling the credit cards.

FIG. 1 illustrates a CIU system for processing reissue requests, and for ranking reissue records according to a first embodiment of this invention. Among other components, CIU system 100 comprises a mainframe system 102 and a production facility system 104. Mainframe system 102 comprises a first computing device 106 for electronically receiving modifications to cardholder records from client interfaces 124, 126, 128; and for building information necessary for fulfilling reissue transactions. Computing device 106 may be a VAX/VMS or the like available from DEC® (Digital Equipment Corporation). Mainframe system 102 further comprises an address database 108 for storing cardholder addresses and a name database 110 for storing cardholder names.

Production facility system 104 comprises a second computing device 112 for processing and fulfilling reissue transactions in conjunction with first computing device 106; and an embossing machine 114 for embossing CIUs with cardholder information. Production facility system 104 further includes a mail processing machine 116 for generating card carriers, and for attaching the carriers to CIUs. These are inserted along with other CIU components into an envelope for mailing to the cardholder. Computing device 112 is typically an AS/400 computing device by IBM® (International Business Machines). One of ordinary skill in the art will realize that other computing devices within the spirit and scope of the present invention may be employed.

Computing device 106 is communicably coupled to computing device 112 via a communication link 118. Communication link 118 may be a cable (e.g., RS232) or wireless link for example.

In use, before a credit card expires, cardholder reissue records are generated for cardholder accounts in good standing. The records may be generated by mainframe 106 about one month prior to expiration. The records contain cardholder information from various databases. These databases include address database 108 (FIG. 1) for storing cardholder addresses, and name database 110 for storing cardholder names. Although not shown, various other types of information may be stored in other databases. After the cardholder records are generated, they are forwarded to the production facility.

At the facility, the records are selected by operators to begin the embossing process as further described with reference to FIG. 2. Although not necessary, the record is typically selected when the production facility has the capacity (equipment, personnel, etc.) to begin fulfillment of the credit card. In one embodiment, the selected records are run through an eligibility process to determine whether the cardholders are still eligible for reissue. It should be noted that this embodiment is used with CIU reissue review. If the cardholder accounts remain eligible, the records are used to fulfill the credit cards.

Preferably, records are grouped into four groups for the production facility to select. In one embodiment, the records are randomly grouped when CIU reissue review is used. In another embodiment, grouping depends on discretionary criteria selected by a client. This allows scores to be assigned to the groups, for example. Group 1 may contain records with the highest scores, group two contains the next lowest scores, etc. Thereafter, group one records are processed and fulfilled first, followed by group two records and, so forth. In this manner, higher scoring records are processed prior to lower scoring records in accordance with this invention.

It should be noted that the client's criteria may be a reissue qualification score (RQS) that is based on a behavior score or a discretionary assignment. If neither CIU reissue review nor RQS is used, the CIU records are grouped by set-ups and no group number is assigned.

Fulfillment is implemented using embossing machine 114 and mail processing machine 116. Embossing machine 114 receives cardholder information such as names, account numbers, expiration dates, encoding information, etc. These are physically imprinted on the credit cards. Mail processing machine 116 receives card carrier information such as mailing addresses, account numbers, primary cardholder names, credit limits, etc. for printing on card carriers. Next, credit cards and card carriers are matched for insertion into envelopes, and for mailing to cardholders.

Mail processing machine 116 includes components for achieving this function. Although not shown, such components may include a paper feeding mechanism for feeding sheets to a bin for receiving paper from the paper feeding mechanism; and a printer for printing alpha-numeric characters on the paper. One non-limiting example of how mail processing machine 116 may be constructed is disclosed in a U.S. application Ser. No. 10/045,589 entitled "Systems and Methods for Providing Inserts into Envelopes," filed Nov. 8, 2001 by the assignee of the present invention, the aforementioned application being hereby incorporated by reference as if fully set forth in this specification.

Figure 2:
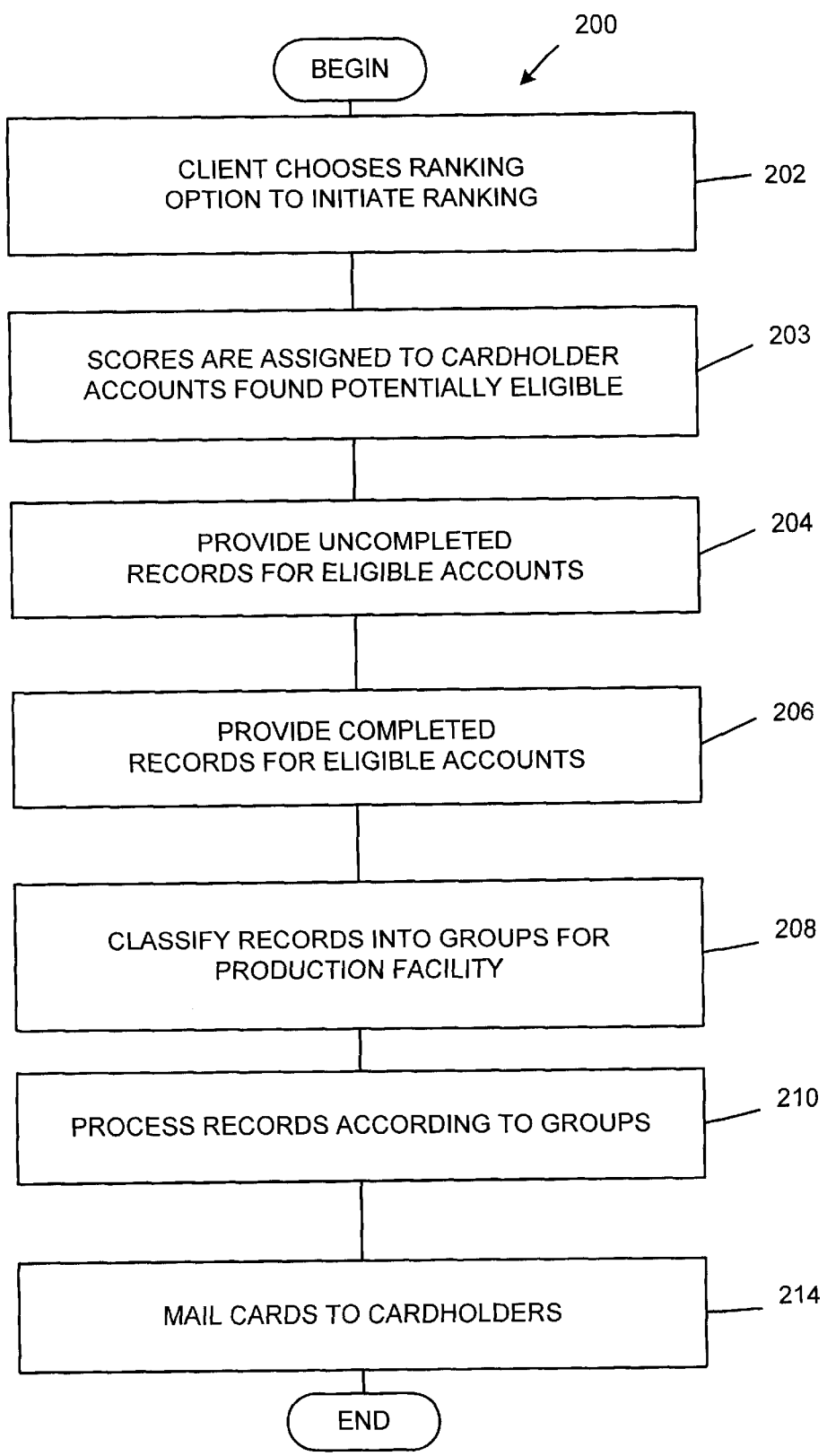
FIG. 2 is illustrates a method for processing reissue requests, and for ranking reissue records according to an embodiment of the present invention.

FIG. 2 illustrates a method 200 for reissue processing, and for ranking to renew CIUs in accordance with an embodiment of this invention. Method 200 may be implemented by system 100 of FIG. 1.

At block 202, reissue processing with ranking begins prior to expiration of a CIU such as a credit card. This process is initiated at month end processing, typically the two months before a credit card expires. In this manner, sufficient time in advance of expiration is provided not only for processing but also for mailing the new card to the cardholder. Prior to month end, the client chooses the ranking option. This option is selectable via client interfaces 124, 126 and 128. When chosen, ranking is stored in a PCF (product control file), as described below.

At step 203, scores (or values) are assigned to cardholders found potentially eligible. These cardholder accounts are identified as being potentially eligible for reissue. One technique for identification is to run account information about cardholders through a product control file (PCF). Although PCF generally contains parameters to control various segments of CIU processing, it may include eligibility criteria for determining whether cardholder accounts are in good standing, and are potentially eligible for reissue. Such criteria may include cardholder spending patterns, credit limits, etc.

Another technique for identification is to employ an adaptive control system (ACS). ACS contains criteria for determining a behavioral score based on cardholder patterns. For example, for credit cards, ACS compares spending habits, high balance, lateness, etc. and assigns a behavior score for determining whether the cardholder is eligible for reissue. While ACS examines lower level details, PCF uses higher level information about cardholders. It should be noted that with either ACS or PCF, the cardholder accounts validate against client-specified criteria.

In one embodiment, the scores that are assigned to potentially eligible cardholder accounts are Reissue Qualification Scores (RQS). The RQS may be automatically populated based on a Behavior Score or manually populated by customer entry. The behavior score is obtained from cardholder spending habits, high balance, etc., as noted above. It should be noted that this behavior score is updated monthly. If the behavior score is used, this score is placed in an RQS field. The RQS field typically has the same value in it until the account enters the reissue process again and a new behavior score is accessed.

Also, the RQS field may be manually populated. If the RQS manual population option is chosen, the client may populate the field at any time. RQS scores may be assigned whether or not the account is eligible, but are used when the account is eligible.

At block 204, uncompleted records for cardholders are generated by mainframe 106. Uncompleted records contain minimal information about cardholders. Such information may be an account cardholder name, for example. Thereafter, the uncompleted records are selected by production facility system 104 operators for reissue processing. These records are typically selected when there is capacity (equipment, personnel, etc.) to fulfill credit cards. When selected, cardholder accounts are evaluated to determine whether they are eligible for credit card reissue if the CIU reissue review option is used. The second eligibility review process uses PCF or ACS, as described above. It should be observed that the review process occurs during CREATE as further described in the herein identified parent application.

At block 206, if cardholder accounts remain eligible, complete records are generated and forwarded to the production facility. If the cardholder accounts are ineligible, eligibility review is deferred until a later date known as a "reinstate" day. On this date, previously ineligible cardholder accounts are reevaluated to determine eligibility. If those cardholder accounts are found eligible, complete records are forwarded to the production facility.

At block 208, the records are classified into groups for the production facility to select. Preferably, there are four groups, each group containing no more than 25% of a customer's embossing records. The first group has records with the highest scores, the second group contains the next highest scores, the third group has the next lowest scores and the fourth group has the lowest scores. In this manner, credit cards for preferred cardholders are generated before cards for high risk cardholders. Financial institutions are better able to reduce risk because high risk cardholders are processed last. It should be observed that classification of records is not limited to reissue processing but is applicable to new records as well. Thus, records for prospective new cardholders may be grouped as proves necessary.

At block 210, the first group of records with the highest scores are fulfilled before the second group with lower scores. That is, group 1 records are fulfilled first, followed by groups 2, 3 and 4, in that order. In this manner, ranking of reissue records is provided by one embodiment of this invention. By ranking reissue records, a hierarchy for fulfillment is created wherein credit cards for the best customers are fulfilled before those for less preferred clients. The production facility quickly provides credit cards to low risk cardholders. This causes delay in processing of high risk records and reduces material waste.

At block 214, the credit cards are mailed to the cardholders after fulfillment. In this fashion, the present invention provides a system for reissue processing, and for ranking reissue records to reissue cards to cardholders.

While the above is a complete description of exemplary specific embodiments of the invention, additional embodiments are also possible. For example, although the present invention has been described with reference to reissue processing, ranking may used with processing new cardholders. Thus, the above description should not be taken as limiting the scope of the invention, which is defined by the appended claims along with their full scope of equivalents.

What is claimed is:

1. A method for selectively processing information to reissue credit cards, to cardholders, the method comprising:

assigning scores to cardholder accounts;

evaluating the cardholder accounts to determine eligibility for reissue;

classifying into one or more groups, those cardholder accounts found eligible for reissue, wherein a first one of the groups contain cardholder accounts with a first set of scores, and a second one of the groups contain cardholder accounts with a second set of scores; and processing the first group with the first set of scores before processing the second group with the second set of scores, wherein the first set of scores is indicative of a better credit risk than the second set of scores.

2. The method of claim 1 wherein the cardholder accounts are cardholder accounts that are scheduled for reissue.

3. The method of claim 1 wherein the act of processing the first group further comprises embossing the credit cards with cardholder information.

4. The method of claim 1 wherein the act of evaluating cardholder accounts further comprises comparing cardholder information with eligibility criteria to determine cardholder eligibility.

5. The method of claim 1 further comprising receiving criteria to determine the score from a client.

6. The method of claim 1 wherein the scores are assigned based on an account behavior score.

7. A method for ranking records in order to issue cards, the method comprising:

providing a first record for issuing a first card;

providing a second record for issuing a second card;

assigning a first value to the first record;

assigning a second value to the second record;

using the first value to classify the first record into a first group;

using the second value to classify the second record into a second group; and processing the first group to issue the first card before processing the second group, wherein the first value is indicative of a better credit risk than the second value.

8. The method of claim 7 wherein the first record is a reissue record having account information about a current cardholder.

9. The method of claim 7 wherein the first record is a new record having information about a prospective applicant.

10. The method of claim 7 wherein the first value is an account behavior score.

11. The method of claim 7 wherein the first value is a discretionary value provided by a client.

12. A method for ranking records to reissue credit cards to cardholders, the method comprising:

providing a first record for reissuing a first credit card;

providing a second record for reissuing a second credit card;

assigning a first score to the first record;

assigning a second score to the second reissue record, the second score being different from the first score;

grouping, by using the first score, the first reissue record into a first group;

grouping, by using the second score, the second reissue record into a second group;

selecting the first group for reissue of the first credit card before selecting the second group, wherein the first score is indicative of a better credit risk than the second score.

13. The method of claim 12 wherein the act of assigning a first score further comprises assigning scores provided by a reissue qualification process.

14. A system for ranking records to reissue cards to cardholders, the system comprising:

programming code for assigning scores to cardholder accounts that are scheduled for reissue;

programming code for evaluating cardholder accounts to determine eligibility for reissue;

programming code for classifying the cardholder into groups, wherein a first group contains cardholder with a first set of scores, and a second group contains cardholder with a second set of scores, the second set of scores being different from the first set of scores;

programming code for processing the records for the first group before processing the records for the second group, wherein the first set of scores is indicative of a better credit risk than the second set of scores.

15. The system of claim 14 further comprising programming code for assigning scores from a reissue qualification process.

* * * * *